United States Patent [19]

Vince

[11] 3,912,940
[45] Oct. 14, 1975

[54] DC POWER SUPPLY

[75] Inventor: John Vince, Lansdale, Pa.

[73] Assignee: Honeywell Inc., Minneapolis, Minn.

[22] Filed: Sept. 18, 1974

[21] Appl. No.: 507,258

[52] U.S. Cl. ............... 307/64; 340/248 R; 307/86
[51] Int. Cl.² ........................................ H02J 9/00
[58] Field of Search ............ 307/64, 86, 60, 65, 66, 307/61, 62, 63, 23; 340/248 R, 333; 315/86; 330/124 D; 321/16

[56] References Cited
UNITED STATES PATENTS

| 3,505,531 | 4/1970 | Wattson | 307/64 |
| 3,808,452 | 4/1974 | Hutchinson | 307/64 |

Primary Examiner—Robert K. Schaefer
Assistant Examiner—M. Ginsburg
Attorney, Agent, or Firm—Arthur H. Swanson; Lockwood D. Burton

[57] ABSTRACT

A redundancy power supply apparatus includes conventional regulating amplifiers having the capability of responding to a remote sensing of the condition of the energization of a controlled bus; together with auctioneering diodes to render only one of the regulating amplifiers at a time in control of the energization of the bus. The remote sensing circuits of each of the regulating amplifiers includes a feedback limiting feature which is effective to maintain the stand-by amplifier in an operative state but at a reduced level. Output indicators are connected to the output terminals of each of the regulating amplifiers to indicate the functional condition thereof.

5 Claims, 2 Drawing Figures

PRIOR ART

F I G. I

DC POWER SUPPLY

BACKGROUND OF THE INVENTION

1. Field of the Invention

The present invention relates to DC power supply apparatus, and more particularly to a DC power supply arrangement having a back-up redundancy.

2. Description of the Prior Art

With the advent of modern complex electronic computers, it has become essential that care must be taken to maintain a proper supply of energizing voltage for the several components of the computer. To this end, redundant power supplies have been provided with auctioneering type transfer means. Under such conditions, when one of the power supply circuits is first activated, the other power supply circuit is biased to cut-off. The unactivated circuit then serves as a stand-by unit until the activated circuit begins to fall. When the activated circuit begins to fail, the cut-off bias is removed from the stand-by circuit and that circuit will then take over the control of the energization of the load.

With such arrangements, wherein the stand-by circuit is biased to cut-off, there is no way of being assured that the stand-by circuit is, itself, operative during the time of stand-by. If, in fact, the stand-by circuit has, for one reason or another, become non-operative, such condition will not become apparent until the primary supply circuit fails. Then it is too late to preserve the functioning of the computer components.

SUMMARY OF THE INVENTION

It is, accordingly, an object of the present invention to provide an improved power supply apparatus having a redundancy stand-by circuit which obviates the deficiencies of the prior art arrangements.

It is another object of the invention to provide an improved power supply apparatus as set forth and including means for monitoring the operability of the stand-by circuit.

It is a further object of the present invention to provide an improved power supply apparatus as set forth wherein the stand-by circuit is not biased to cut-off.

In accomplishing these and other objects, there has been provided, in accordance with the present invention, a power supply means involving a first and a second power supply regulation circuits, each connected through auctioneering diodes to system bus lines. The bus voltage sensing and feedback circuit includes means for maintaining the stand-by circuit in actual operation during stand-by conditions albeit at a voltage level sufficiently below the bus voltage as to be inactive relative to the bus. Because the stand-by circuit is operative, the output thereof may be monitored to indicate the condition thereof.

BRIEF DESCRIPTION OF THE DRAWING

A better understanding of the present invention may be had from the following detailed description when read in conjunction with the accompanying drawings, in which.

DESCRIPTION OF A PREFERRED EMBODIMENT

Figure 1:
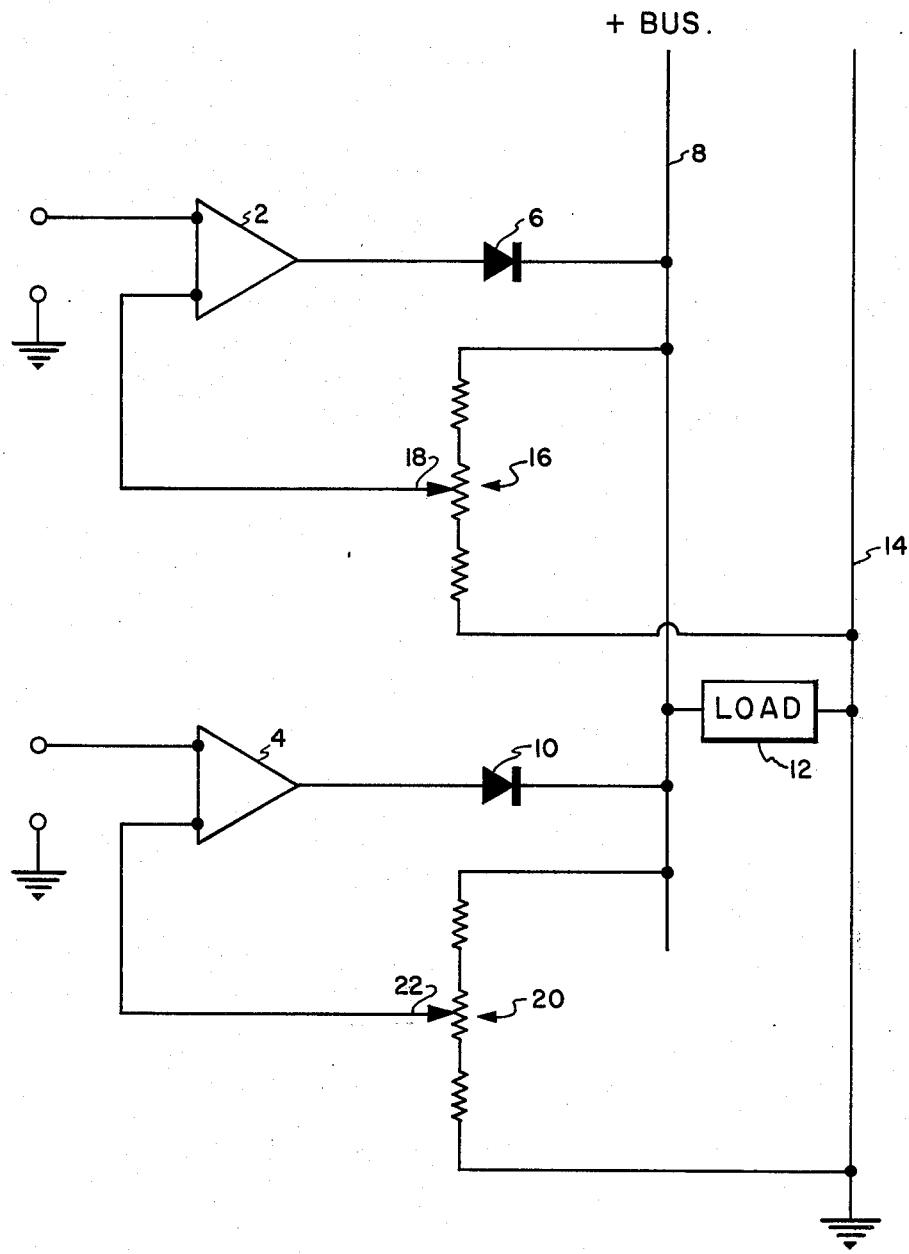
FIG. 1 is a schematic block diagram of a prior art auctioneering power supply system.

The prior art device shown in FIG. 1 includes a first regulating amplifier 2 and a second regulating amplifier 4. The input terminal of each of the two amplifiers is connected to a suitable full-wave rectifier or other power source (not shown).

The output terminal of the first regulating amplifier 2 is connected, through an auctioneering diode 6, to a positive bus 8. Similarly, the output terminal of the second regulating amplifier 4 is connected, through a second auctioneering diode 10, to the positive bus 8. A suitable load device 12 is connected between the positive bus 8 and a common return bus 14.

Also connected between the positive bus 8 and the common bus 14 is a first voltage divider 16. A pick-off slider 18 on the voltage divider 16 is connected in a feedback loop to the second input terminal of the first regulating amplifier 2. A similar voltage divider 20 is also connected between the positive bus 8 and the common 14. a pick-off slider 22 associated with the voltage divider 20 is connected in feedback relation to the second input terminal of the second regulating amplifier 4.

In operation, when unregulated power is applied simultaneously to the input terminals of the two regulating amplifiers, because of internal parameters, one will arrive at the desired output voltage level before the other. Let it be assumed that the first amplifier 2 is the first to achieve that level. Under those conditions, the first amplifier 2 will supply a regulated voltage to the bus 8. The feedback established by the voltage divider 16 stabilizes the output of the amplifier 2 at the desired level. The same voltage on the bus 8 will back-bias the diode 10 in the output of the second amplifier 4, blocking transmission of energy therethrough. At the same time, the second voltage divider 20 will sense the voltage on the bus 8. Since the amplifier 4 had not yet reached the established output condition, the feedback signal appears to be excessive and biases that amplifier to cut-off. The second amplifier then assumes the stand-by role.

If the first amplifier 2 begins to fail, the voltage on the bus 8 drops below the established level. The decrease in voltage is sensed by the voltage divider 20. The resulting feedback signal to the second amplifier will be such as to cause that amplifier to be restored to operative condition and take over control of the energization of the bus 8, hence, of the load 12.

The foregoing is the intended operation of the apparatus. If, however, the second amplifier for some reason was nonoperative, was incapable of taking over control of the energization of the bus 8, there would be no prior warning of its condition. Its normal status is substantially zero output during stand-by, hence, there is no way of monitoring its condition during stand-by operation.

Figure 2:
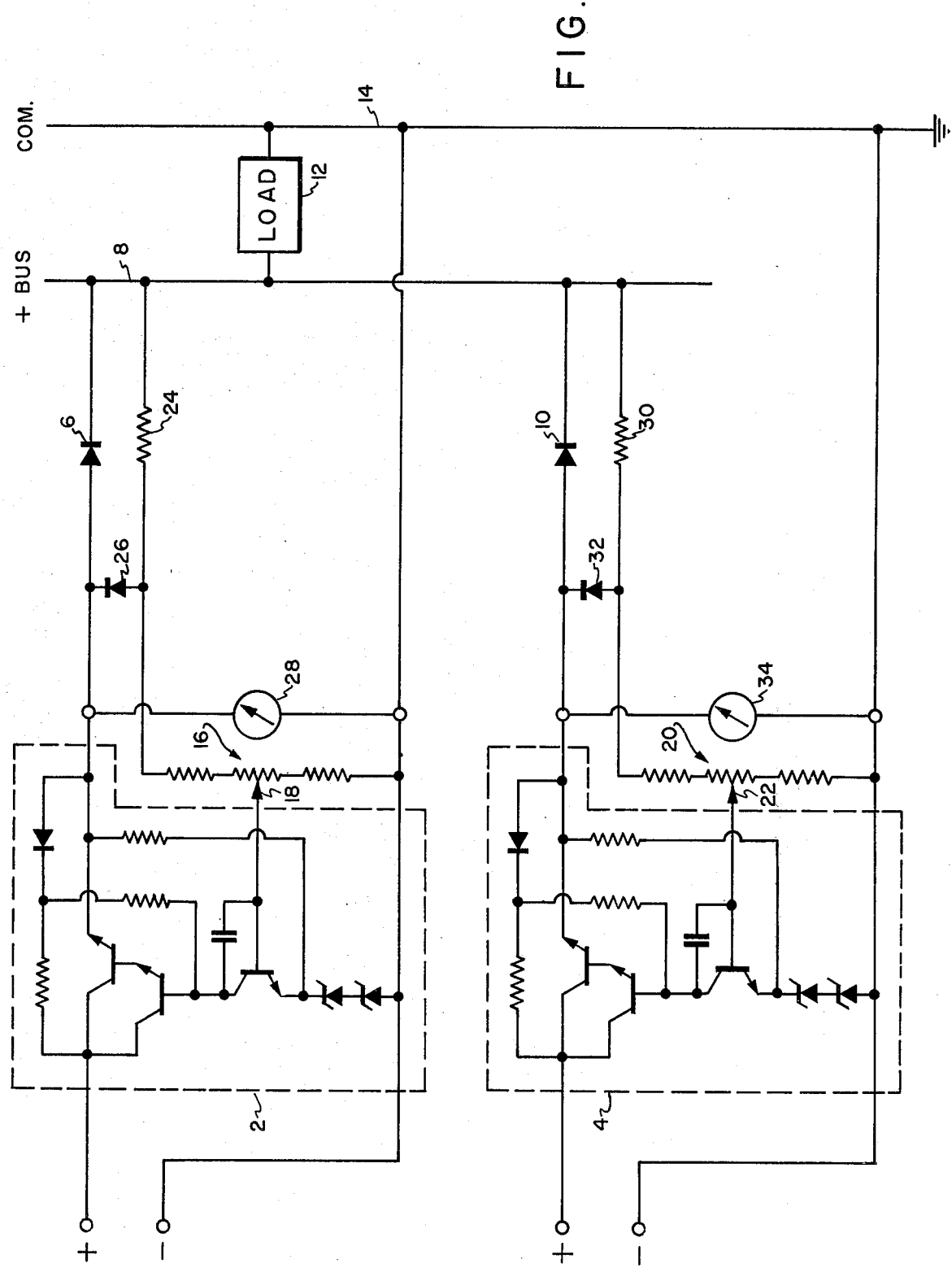
FIG. 2 is a schematic circuit diagram of a power supply apparatus embodying the present invention.

In FIG. 2, there is shown a similar redundant power supply apparatus but embodying the present invention to overcome this deficiency of the previously described apparatus.

In the illustrative embodiment in FIG. 2, circuit elements which also appear in FIG. 1 will bear the same reference numerals as the corresponding parts in FIG. 1. Thus, there is provided a first regulating amplifier 2 and a second regulating amplifier 4. The output terminal of the first regulating amplifier 2 is connected through a first auctioneering diode 6 to the positive bus 8. Similarly, the output terminal of the second regulating amplifier 4 is connected through a diode 10 to the positive bus 8. Again, a suitable load device 12 is connected between the positive bus 8 and a common return bus 14. As before, feedback signals for the first amplifier 2 are derived from a voltage divider 16 by way of a slider 18 associated therewith. The feedback signal for the second regulating amplifier 4 is derived from the second voltage divider 20 by way of the slider 22 associated therewith.

Regulating amplifiers providing means for remote sensing of the bus potential are well known. The structure represented as amplifiers 2 and 4 in FIG. 2 are typical of such regulating amplifiers.

In FIG. 2 the voltage divider 16 is connected to the bus 8 through a relatively small resistor 24. Further, a feedback limiting diode 26 has its anode connected to the junction between the resistor 24 and the voltage divider 16. The cathode of the diode 26 is connected to the output terminal of the amplifier 2, and hence, to the anode of the diode 6. A voltage monitoring meter 28 is connected between the output terminal of the amplifier 2 and the common return bus 14.

Similarly, the voltage divider 20 is connected to the positive bus 8 through a relatively small resistor 30. The anode of a feedback limiting diode 32 is connected to the junction between the resistor 30 and the voltage divider 20. The cathode of the diode 32 is connected to the output terminal of the amplifier 4 and, hence, to the anode of the diode 10. A voltage monitoring meter 34 is connected between the output terminal of the amplifier 4 and the common return bus 14.

In operation, let it be assumed that the amplifier 2 was the first to reach the desired control voltage and thereby assumes control of the energization of the bus 8. That control is accomplished in the same way as it was accomplished in connection with the circuit shown in FIG. 1. That is, when the bus 8 arrives at the designated signal level by virtue of the first amplifier 2 reaching its predetermined output level, the diode 10 in the output circuit of the second amplifier 4 is back-biased and the feedback loop for the second amplifier 4 tends to turn the second amplifier off. With respect to the operating characteristics of the output circuit associated with the amplifier 2, the actual potential at the output terminal of the amplifier 2 is higher than the desired potential at the bus 8 by the amount of the voltage drop across the diode 6. That drop may be on the order of eight-tenths of a volt. At the same time, the resistor 24 is selected to provide about a half a volt drop. Thus, the potential at the cathode of the diode 26 is higher by something more than one volt than is the anode thereof. Therefore, the diode 26 is back-biased.

The adjustment of the slider 18 on the voltage divider 16 is such as to maintain the output to the positive bus 8 at the desired level. When that desired level is also sensed by the feedback circuit associated with the second amplifier 4, the slider 22 having been pre-adjusted to establish the same response characteristic as the slider 18, and since the output of the amplifier 4 by hypothesis has not yet reached the established output level, the feedback signal appears to the amplifier to be excessive; and, therefore, tends to reduce the output of the amplifier 4. As the output of the amplifier 4 begins to be reduced, the potential across the feedback limiting diode 32 is such as to forwardly bias that diode, resulting in a conduction therethrough. The voltage drop across the conducting diode 32 will be typically, on the order of six-tenths of a volt. Therefore, the output of the amplifier 4 will be stabilized at such a level as to maintain that potential at the output terminal thereof, i.e., at the cathode of the diode 32, at the level substantially six-tenths of a volt less than the potential established at the anode of the diode 32 by virtue of the desired signal appearing at the bus 8. Under such conditions, there will be sufficient signal at the output terminal of the amplifier 4 to register the operating condition of that amplifier, even though it may be on stand-by condition, on the meter 34. It is clearly apparent that the meter 28 in the output circuit of the first amplifier 2 will register the operating condition of that amplifier. It will be appreciated, that while meters 28 and 34 have been illustrated as the means for indicating the operating condition of the two amplifiers, other suitable means, such as indicator lights or the like, may be used.

Let it now be assumed that for some reason the amplifier 2 begins to fail. The voltage on the bus 8 will start to diminish and will continue to decrease until such time as the feedback limiting diode 32 is reversed biased. It will be recalled that the amplifier 4 will try to maintain the then existent signal level at the output thereof. When the voltage at the bus 8 has diminished significantly below the level maintained by the amplifier 4, the diode 32 will be reverse biased. As that point, the diode 10 will also be forwardly biased and the second amplifier 4 will then assume control and drive the bus potential back to the established level. When that happens, the feedback limiting diode 26 in the output circuit of the first amplifier will be forwardly biased and the diode 6 will be reverse biased whereupon that amplifier becomes the stand-by amplifier operating in the same manner as previously described in connection with the second amplifier 4. If, however, the first amplifier 2 fails completely, there will be no output signal at the output of that amplifier. Therefore, the indicator 28, whether it be a meter or an indicator light or the like, will show that that amplifier is non-functional, that it may not be relied upon as a stand-by amplifier. When it is seen that the supposedly stand-by amplifier is defective, steps may be taken to replace that amplifier with a properly functional one.

Thus, it may be seen that there has been provided, in accordance with the present invention, an improved power supply apparatus featuring a redundancy stand-by circuit which includes means for monitoring the operable condition of the stand-by amplifier.

The embodiments of the invention in which an exclusive property or privilege is claimed is defined as follows:

1. A redundancy power supply apparatus comprising:
    a first and a second regulating amplifier circuit, means including auctioneering diodes connecting said first and second regulating amplifier circuit in parallel to a controlled bus,
    a first remote sensing circuit connected in feedback relationship between said controlled bus and said first regulating amplifier circuit,
    a second remote sensing circuit connected in feedback relationship between said controlled bus and said second regulating amplifier circuit,
    said remote circuits including adjustable means operative to establish the signal level at which said bus will be controlled and to establish control of that bus by that one of the first and second regulating amplifier circuits which first reaches rated output and to relegate the other amplifier circuit to stand-by condition, said remote sensing circuits each including a series resistance means connected between said bus and said adjustable means and a feedback limiting diode connected between an output terminal of the associated amplifier circuit and the junction between said series resistance means and said adjustable means whereby to maintain said amplifier circuit relegated to stand-by condition operative at a reduced output level, and indicating means connected to said output terminals of said amplifiers to indicate the operation of the stand-by amplifier circuit.

2. The power supply apparatus as set forth in claim 1 wherein said indicating means comprises a meter.

3. The power supply apparatus as set forth in claim 1 wherein said indicating means is an indicator light device.

4. The power supply apparatus as set forth in claim 1 wherein said adjustable means comprises an adjustable voltage divider.

5. A redundancy power supply apparatus for regulating the energization of a controlled bus, said apparatus comprising:

a first regulating amplifier having an output terminal, a second regulating amplifier having an output terminal, a first auctioneering diode connected between said output terminal of said first regulating amplifier and the controlled bus, a second auctioneering diode connected between said output terminal of said second regulating amplifier and said controlled bus, a first remote sensing circuit connected in feedback relationship between said controlled bus and said first regulating amplifier, said first remote sensing circuit including a first voltage dividing feedback adjusting means, said first remote sensing circuit further including a resistance means connected in series between said controlled bus and said first adjusting means, and a feedback limiting diode connected between said output terminal of said first amplifier and the junction between said resistance means and said first voltage dividing feedback adjusting means, a second remote sensing circuit connected in feedback relationship between said controlled bus and said second regulating amplifier, said second remote sensing circuit including a second voltage dividing feedback adjusting means, said second remote sensing circuit further including a further resistance means connected in series between said controlled bus and said second adjusting means, and a further feedback limiting diode connected between said output terminal of said second amplifier and the junction between said further resistance means and said second voltage dividing feedback adjusting means, and first and second condition indicating means connected, respectively, to the output terminals of said first and second amplifiers whereby to indicate the operative condition of said amplifiers.

* * * * *